United States Patent
Iwamoto

[11] Patent Number: 5,957,042
[45] Date of Patent: Sep. 28, 1999

[54] METHOD AND APPARATUS FOR CONTINUOUSLY PRODUCING BEAN CURD WITH GARNISH WRAPPED THEREIN

[76] Inventor: Hiroaki Iwamoto, 318-5, Inaricho, Tanabe-shi, Wakayama-ken 646, Japan

[21] Appl. No.: 09/089,387

[22] Filed: Jun. 3, 1998

Related U.S. Application Data

[62] Division of application No. 09/008,839, Jan. 12, 1998.

[51] Int. Cl.[6] .................................. A23L 1/20; A23J 1/00
[52] U.S. Cl. .................................. 99/494; 99/483; 99/452
[58] Field of Search .............................. 99/453, 452, 483, 99/450.1, 450.4, 485, 494, 516, 450.6, 450.7; 426/634

[56] References Cited

U.S. PATENT DOCUMENTS

| | | | |
|---|---|---|---|
| 4,771,681 | 9/1988 | Nagata | 99/483 |
| 4,806,087 | 2/1989 | Hayashi | 99/450.7 X |
| 4,996,916 | 3/1991 | Miyawaki et al. | 99/483 X |

*Primary Examiner*—Reginald L. Alexander
*Attorney, Agent, or Firm*—Oblon, Spivak, McClelland, Maier & Neustadt, P.C.

[57] ABSTRACT

This invention relates to a method and an apparatus of continuously producing a bean curd. A first soybean supply nozzle (21) is positioned on a belt conveyor (10) to supply soymilk up to a half of the thickness of the bean curd to be produced. A hopper unit (41) is provided to place garnishes (G) onto the soymilk being carried on the conveyor belt. Furthermore, a second soymilk supply nozzle is provided to supply additional soymilk over the soymilk with garnishes carried on the belt conveyor till a certain level. A solidifying process and a maturing process of the materials placed over the conveyor (10) progress along with time during the supply stages. Then what is obtained from these steps after solidification is a bean curd with garnish(es) center.

7 Claims, 7 Drawing Sheets

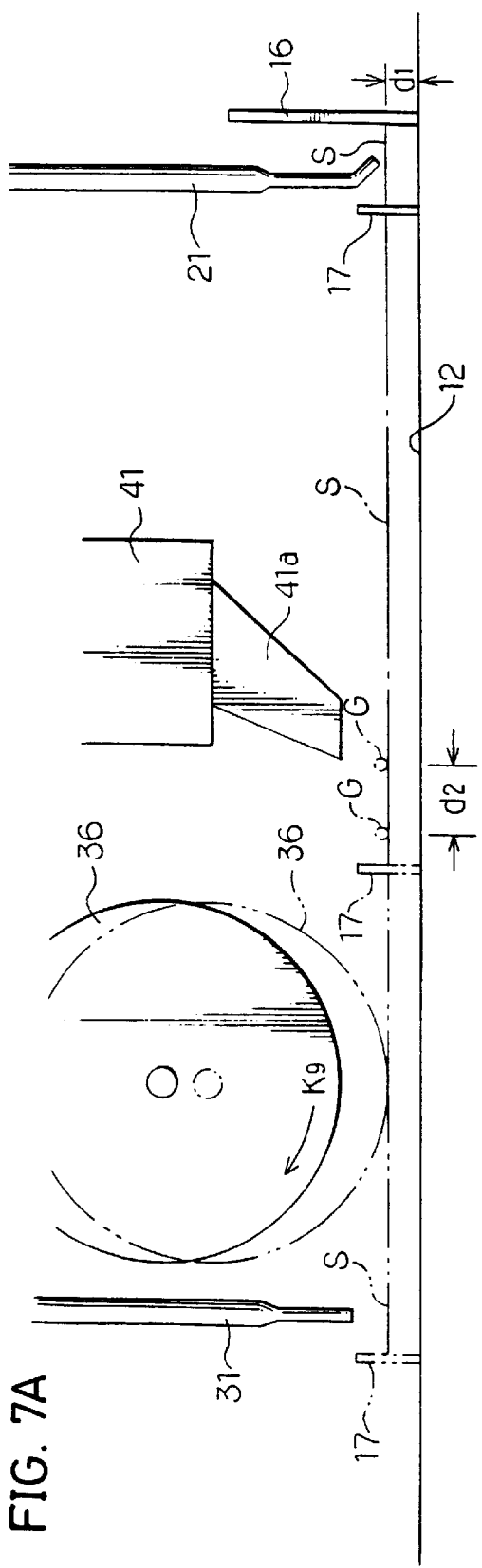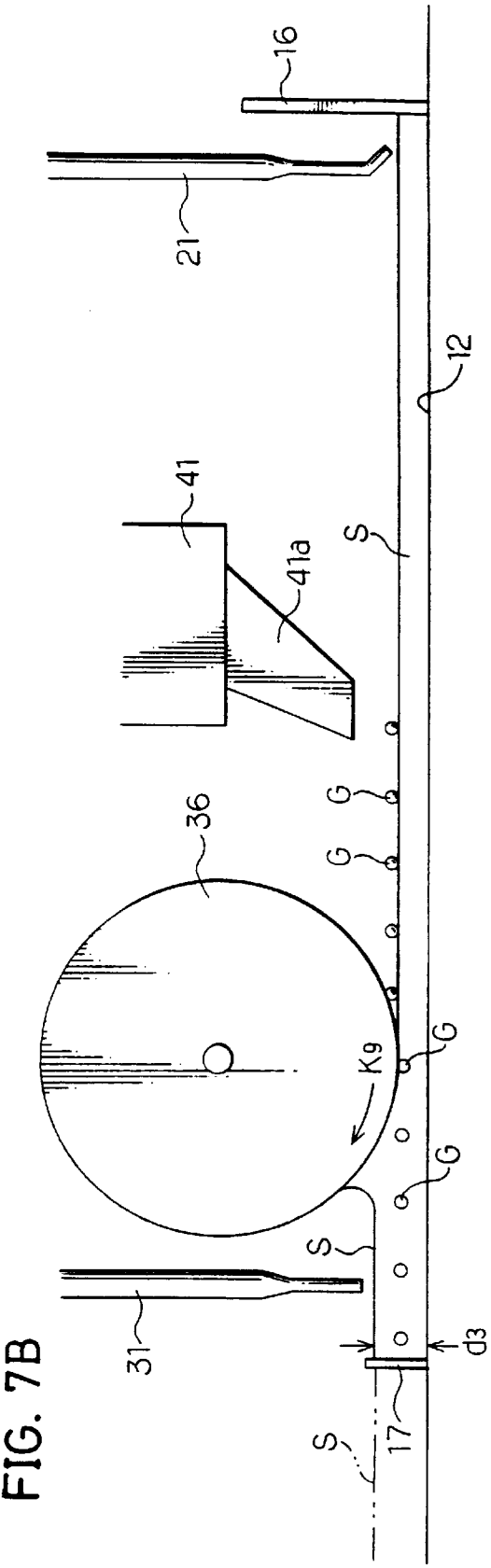

METHOD AND APPARATUS FOR CONTINUOUSLY PRODUCING BEAN CURD WITH GARNISH WRAPPED THEREIN This Application is a division of application Ser. No. 09/008,839, filed on Jan. 12, 1998.

BACKGROUND OF THE INVENTION AND RELATED ART STATEMENT

This invention relates to a method of continuously producing bean curd with a garnish placed therein (hereinafter also referred to as bean curd with garnish) and an apparatus to continuously producing the same.

A word "garnish (small amount of food to add flavor)" used throughout this application is little different from the word "garnish" in its ordinary sense as a garnish in its ordinary sense is added for a decoration purpose. However, the word "garnish" used in this specification is not used for a decoration purpose but for a purpose of adding extra flavor and taste.

In the field of bean curd production, it has been generally a common practice to produce the bean curd by a batch processing. More specifically, the method of producing the bean curd follows a steps in the order as follows: a container is filled with soymilk at a certain volume and then a certain amount of coagulant is added to mature and solidify the soymilk in the container. Thereafter, the soymilk in a solidified & matured state is placed in a water filled tank to cool down and subsequently the fully cooled down soybean is cut into pieces of desired shapes such as rectangular solid or cube.

The bean curd made according to the conventional method contains in essence soymilk with a coagulant; therefore, such bean curd does not have much of added value as a market product. In addition, since the conventional method uses a batch process, cutting down the production time of such bean curd has a limit. Consequently, there is room for improvement in terms of quality as a marketable product and a cut down of the production time.

SUMMARY OF THE INVENTION

It is therefore an object of this invention to solve the problems residing in the conventional method and apparatus described in the foregoing section.

To fulfill the above object according to the present invention, a method of continuously producing bean curd with garnish therein on a moving conveyer comprises: (a) a step of supplying soymilk with a coagulant in an upstream area of the conveyor; (b) a step of placing garnishes on the soymilk being solidified; and (c) a step of supplying additional soymilk with a coagulant.

An apparatus for continuously producing bean curd with garnish therein according to the present invention comprises: a belt conveyor unit; a first soymilk supply nozzle positioned in an upstream area of the conveyor; a second soymilk supply nozzle positioned downstream of the first supply nozzle; and a garnish placement hopper unit provided between the first soymilk supply nozzle and the second soymilk supply nozzle.

These and other objects, features and advantages of the present invention will become more apparent upon reading the following detailed description along with accompanying drawings.

BRIEF DESCRIPTION OF THE DRAWINGS

FIGS. 7A and 7B are explanatory diagrams each showing an operation of the apparatus of FIG. 2.

DETAILED DESCRIPTION OF THE PREFERRED EMBODIMENT OF THE INVENTION

Types of bean curd obtained through this invention includes a bean curd with a solid garnish placed in the middle of the bean curd; another bean curd with a plurality of solid garnishes placed in the middle thereof; and another bean curd with a plurality of solid garnishes placed therein in a dispersed manner.

Figure 1A:
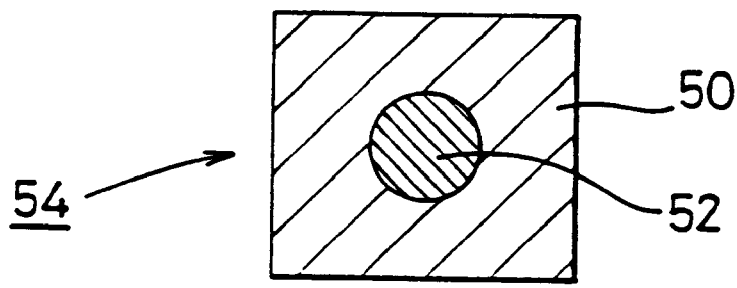
FIG. 1A and FIG. 1B each is a sectional schematic diagram showing a bean curd with a garnish/garnishes therein.
Figure 1B:
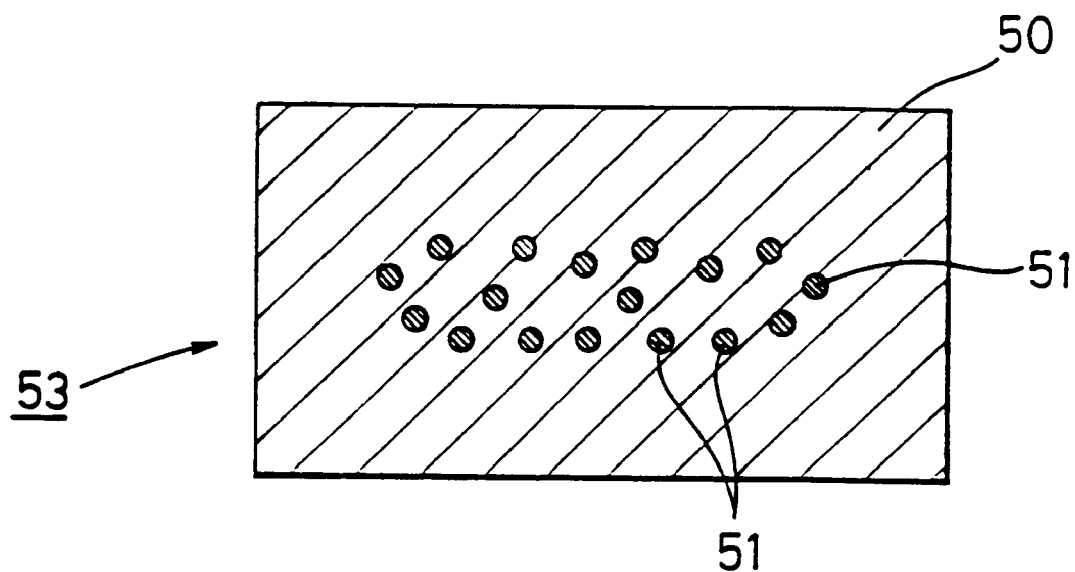

FIG. 1A and FIG. 1B are simplified sectional diagrams showing two types of bean curds to be obtained from this invention. FIG. 1A shows a bean curd 54 with a garnish 52 placed in the middle thereof. FIG. 1B shows another type of bean curd 53 with a plurality of garnishes 51 placed therein in a dispersed manner. An outer periphery portion of the bean curd 53, 54 (i.e., a portion other than a central portion of the bean curd) consists of bean curd portion 50.

Typical examples of a garnish (translated as "gu" in Japanese; a small amount of food which gives an extra flavor or taste to the product) mentioned above are such as a pickled plum, a shallot, a chestnut, a meatball, a shrimp, a mandarin, various kinds of fishes (i.e., salmon, tuna and etc.), various kinds of mushrooms and various kinds of vegetables (i.e., broccoli), various kinds of nuts and beans, various kinds of meats (i.e., chicken, turkey, beef and etc.) and the like. The word "garnish (small amount of food to add flavor)" used throughout this specification is little different from the word "garnish" in its ordinary sense as a garnish in its ordinary sense is added for a decoration purpose. However, the word "garnish" used in this specification is not used for a decoration purpose but for a purpose of adding extra flavor and taste. In fact, any solid or half-solid such as paste form of food could be a garnish for the bean curd of this invention.

A first part of this specification relates to a description of a method of continuously producing the bean curd with garnish placed therein. A gist of this method of continuously producing bean curd with a garnish placed therein on a moving conveyer includes: a step of supplying soymilk with a coagulant in an upstream area of the conveyor; a step of placing garnishes on the soymilk being solidified; and a step of supplying additional soymilk with a coagulant. With this method, it is made possible that the bean curd with a garnish placed therein is continuously produced. Specifically, in order to position the garnish in a central portion of the individual bean curd after cut into a specified dimension, the supply position of the garnishes onto the soymilk being solidified carried on the conveyor can be carefully adjusted considering the cut position and cut dimension of the individual bean curd.

Furthermore, in the method of continuously producing the bean curd with a garnish placed therein, it is preferable that a distance between the first supply of soymilk and the second supply of soymilk is set so as to correspond to $\frac{1}{15}$–$\frac{1}{6}$ of a time period required to completely solidify the first supplied soymilk on the conveyor.

Hereinafter, a first supply of soymilk is referred to as "a first supply" and an additional supply of soymilk is also referred to as "a second supply". It should be also noted that "soymilk with coagulant" is also referred to simply "soymilk" in the specification where no confusion arises.

When the second supply position of the soymilk is so close to the first supply position of the soymilk, rendering a supply position of garnishes comes close to the first supply position, a garnish is placed onto soymilk that is not properly solidified to a level required, thus the placed garnishes may sink further down to the bottom of the soymilk. As a result, it results in an improper positioning of the garnish in the bean curd. On the other hand, when the second supply position is too far away from the first supply position, then a separation between the first supplied soymilk (to be a lower half of the bean curd) and the second supplied soymilk (to be a top half of the bean curd ) will likely occur as a top surface of the first supplied soymilk may already be matured and solidified when the second supply of soymilk is supplied.

However, when the distance between the first supply position and the second supply position of soymilk is set a certain value corresponding to $\frac{1}{15}$–$\frac{1}{6}$ of the time required to full solidification of the soymilk, it is likely that the a garnish stays in the middle of the bean curd and a separation of the top half and the lower half of the bean curd is avoided. For instance, assuming that the time period to complete a solidification of the bean curd is 30 minutes, then a distance between the first supply position and the second supply position is set such that the first supplied soymilk carried on the conveyor takes 2–5 minutes to travel the distance.

A second part of this specification is directed to an apparatus of continuously producing the bean curd with a garnish placed therein. An apparatus of this invention comprises: a belt conveyor unit; a first soymilk supply nozzle (hereinafter also referred to as a first supply nozzle) positioned in an upstream area of the conveyor; a second soymilk supply nozzle (hereinafter also referred to as a second supply nozzle) positioned downstream of the first supply nozzle; and a garnish placement hopper unit provided between the first soymilk supply nozzle and the second soymilk supply nozzle.

With this apparatus, soymilk is supplied by the first supply nozzle at the upstream end of the belt conveyor unit and garnishes are placed by the hopper unit over the soymilk that is being matured and solidified while being carried over the belt conveyor unit and then additional soymilk is supplied by the second supply nozzle over the halfway solidified soymilk with garnishes placed thereon. Thereafter the soymilk (a combination of first supplied soymilk, garnishes and second supplied soymilk) is continuously solidified to become a relatively thick bean curd in the form of a sheet and this sheet form bean curd is discharged from the leading end of the belt conveyor unit.

It is preferable that the belt conveyor unit includes a bottom conveyor and side conveyors, and the bottom conveyor moves in synchronism with the side conveyors.

With this arrangement, the cross sectional shape of the belt conveyor unit is in a form of a square bracket ("]"), thus the soymilk in a liquid form before being fully matured and solidified is prevented from leaking out of the apparatus. Furthermore, as the bottom conveyor moves along with the side conveyors, the soymilk in the halfway solidified form or a fully solidified form carried over the belt conveyor unit is not disintegrated unlike the case with the bottom conveyor moves independently from the side conveyors where the soymilk in the solidified (half or full) form is subject to the disintegration at the contact surfaces of the conveyors.

The apparatus may further comprise a fixed bank plate arranged at an upstream end of the belt conveyor unit and a movable bank plate for moving along with the bottom and side conveyors.

With this arrangement, the fixed bank plate prevents soymilk from leaking out from the upstream end of the apparatus. Whereas, the movable bank plate prevents soymilk supplied by the first supply nozzle (and also second supply nozzle) from leaking out to downstream side of the apparatus.

The second soymilk supply nozzle is preferably set movable along a longitudinal direction of the conveyor belt unit.

With this arrangement, the adequate position of the second supply nozzle is easily set.

The apparatus may further comprise a soymilk back-flow prevention roller provided between the hopper unit and the second soymilk supply nozzle.

With this arrangement, the back flow prevention roller when it is rotated, while maintained at such a height as the lowermost end of the roller is in contact with the surface of the soymilk, prevents the second supplied soymilk from flowing backward to an upstream side and depresses the garnishes placed over the first supplied soymilk layer. Thus vertical positions of the garnishes are uniformly adjusted.

The soymilk back-flow prevention roller may be set movable in synchronism with the second soymilk supply nozzle.

With this arrangement, as the second supply nozzle and the back flow prevention roller move together in a longitudinal direction of the apparatus, in other words, the distance between the two is maintained in a moving direction, thus it can securely prevent the back flow of the second supplied soymilk.

The first soymilk supply nozzle and the second soymilk supply nozzle are preferably set to move along a widthwise direction of the belt conveyor.

With this arrangement, the supply amount of soymilk in the widthwise direction of the belt conveyor unit becomes uniform.

Figure 2:
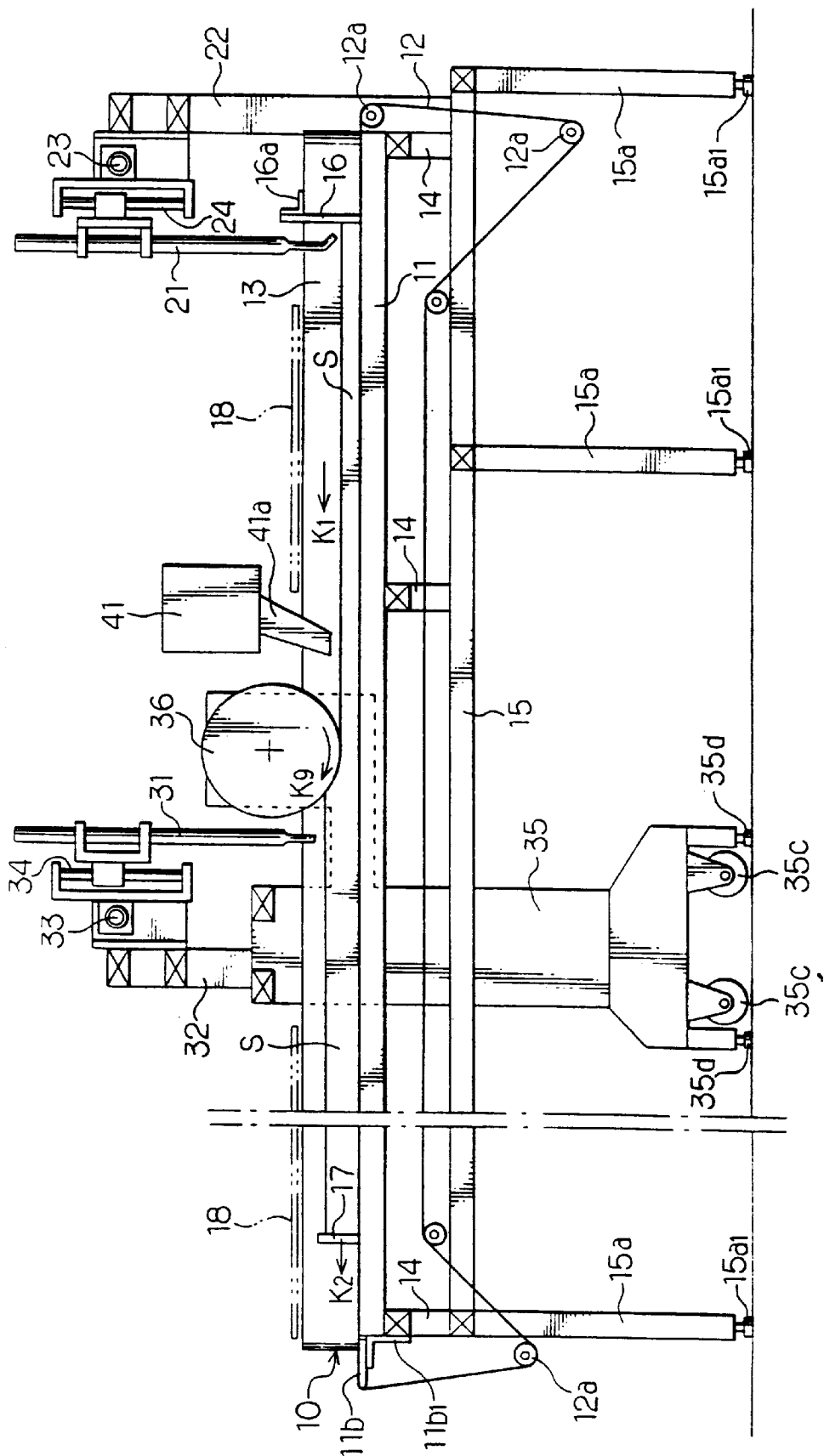
FIG. 2 is a simplified side view showing an entire structure of the apparatus of continuously producing the bean curd with a garnish as an embodiment of the present invention.
Figure 3:
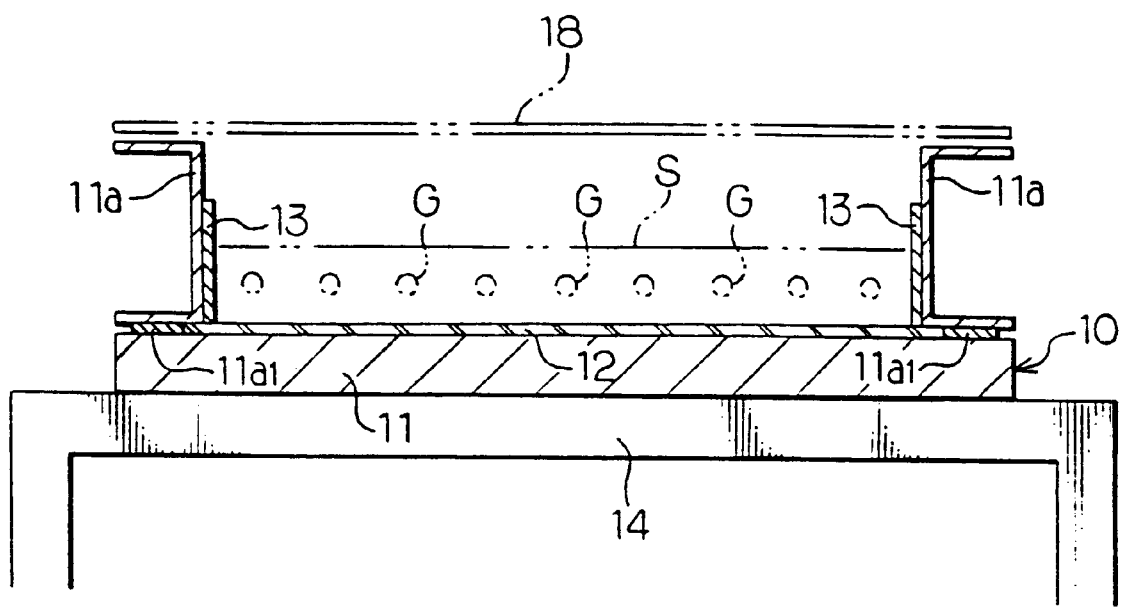
FIG. 3 is a front view in section showing a downstream portion of the apparatus of FIG. 2.
Figure 4:
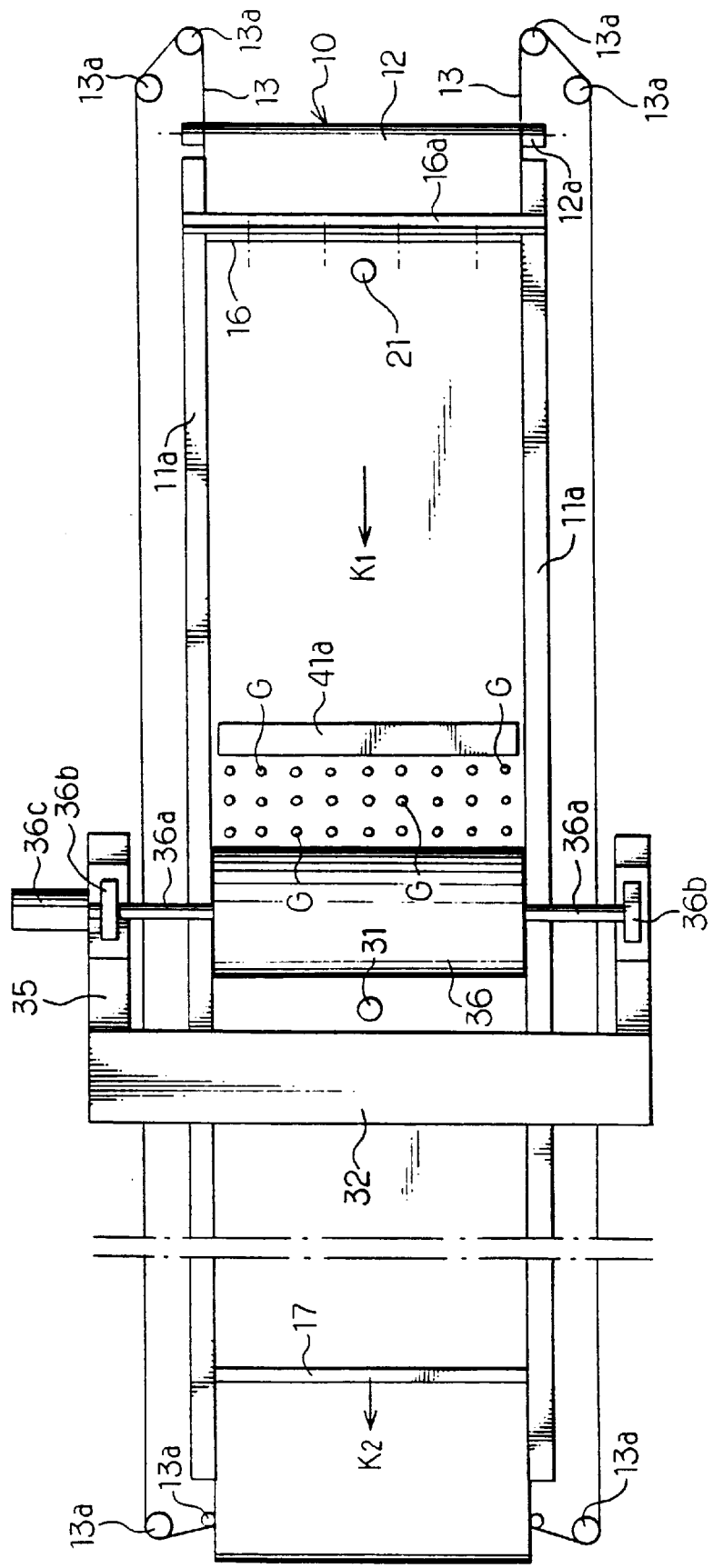
FIG. 4 is a plan view showing the apparatus of FIG. 2.
Figure 5:
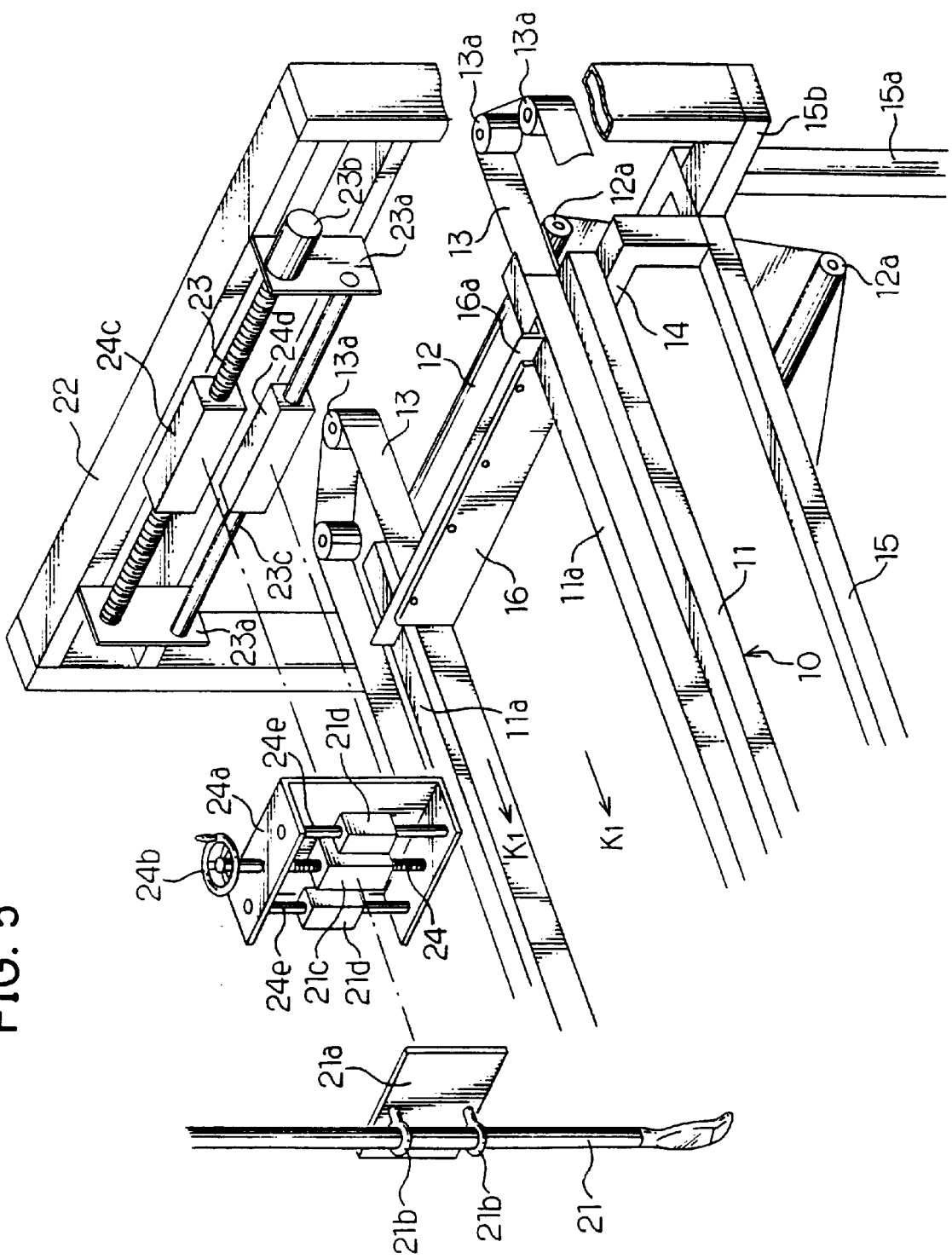
FIG. 5 is a perspective view showing an upstream portion of the apparatus of FIG. 2.
Figure 6:
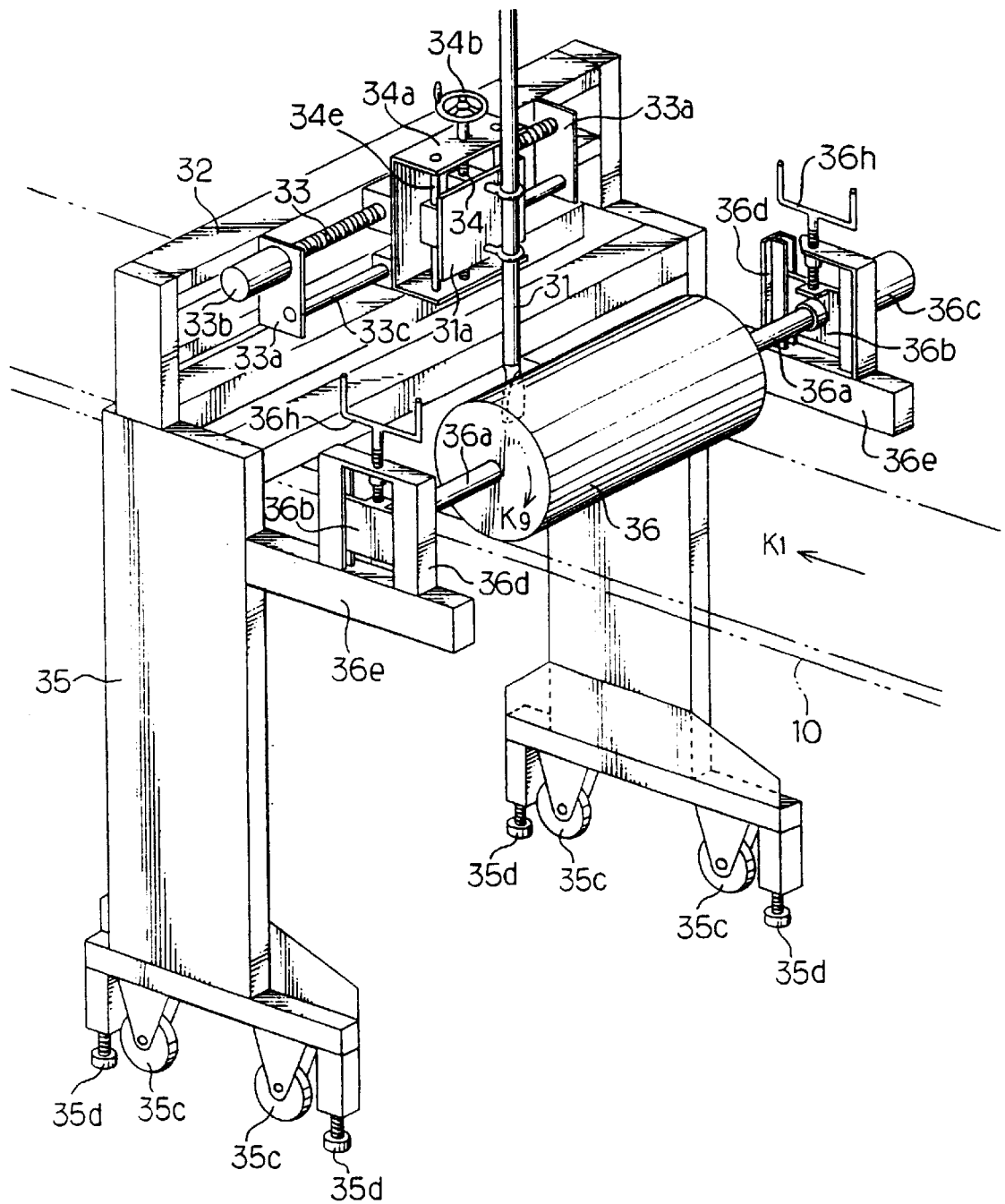
FIG. 6 is a perspective view showing a proximate area of a second soymilk supply nozzle.

FIGS. 2–6 show an apparatus for continuously producing the bean curd with a garnish placed therein as an embodiment of this invention. FIG. 2 is a side view showing an overall structure of the apparatus of this invention. FIG. 3 is an enlarged view showing a cross section of a downstream of the apparatus. FIG. 4 is a top view showing the apparatus of this invention. In FIGS. 2 and 4, a right side corresponds to an upstream side whereas a left side corresponds to a downstream side of the apparatus. Furthermore, FIG. 5 is a perspective view showing an upstream side of the apparatus of this invention. FIG. 6 is a perspective view showing an area proximity of the second supply nozzle of the apparatus of this invention.

The principal elements of the bean curd with a garnish placed therein continuous producing apparatus of this invention (hereinafter simply referred to as the apparatus of this invention or the apparatus) are a belt conveyor 10, a first soymilk supply nozzle (hereinafter simply referred to as a first supply nozzle) 21, a second soymilk supply nozzle (hereinafter simply referred to as a second supply nozzle) 31, and a hopper unit 41.

With reference to FIGS. 2–4, the belt conveyor unit 10 of this embodiment is described.

The belt conveyor unit 10 includes a bottom conveyor 12, side conveyors 13, 13 placed along sides of the bottom conveyor 12, and a support table 11 for supporting the bottom conveyor 12 from the bottom.

The support table 11 is placed on a frame unit 15 consisting of plural Legs 15a, 15a via plural support frames 14, 14 in the form of a lower side opened square bracket ("["). Each, leg 15a has adjust bolts 15a1 at the bottom thereof. With these adjust bolts 15a1, a level of the liquid surface of soymilk in the belt conveyor unit 10 is finely adjusted, enabling production of the bean curd with a uniform thickness. Furthermore, a side frame 11a is provided on the support table 11 on its left and right sides via a spacer 11a1 to support each side conveyor 13. As shown in FIG. 2, a sub-table 11b having an arc shape is provided at the downstream end of the support table 11 with aid of a bracket 11b1 in such a manner that the sub-table 11b projects in a downstream direction from the support table 11 to facilitate a taking out operation of the solidified bean curd therefrom for the further proceeding (unillustrated in FIG. 4).

The bottom conveyor 12, as best shown in FIG. 3, is placed on the support table 11 in such a manner that the both sides (lateral sides) of the bottom conveyor 11 are laid under the side frames 11a, 11a. The bottom conveyor 12 is set such that it is movable along the top surface of the support table 11 from a upstream to a downstream direction (as indicated by an arrow K1 in FIG. 2) with a plurality of guide rollers 12a, 12a.

Similarly, the side conveyors each, as shown in FIGS. 3 and 4, is driven by a plurality of guide rollers 13a, 13a such that it moves from an upstream to a downstream side along the inner surface of the side frame 11a in synchronism with a movement of the bottom conveyor 12. The lower periphery of each side conveyors is set in firm contact with the top surface of the bottom conveyor 12; therefore, supplied soymilk is not spilled out from therebetween.

As shown in FIGS. 2, 4, and 6, a fixed bank 16 is provided in an upstream end of the belt conveyor unit 10. More specifically, this fixed bank 16 is mounted on an angle member 16a bridging between the both side frames 11a, 11a such that the bottom end and the side ends of the fixed bank 16 can slidably contact against the top surface of the bottom conveyor 12 and side surfaces of the side conveyors 13, 13 respectively (see FIG. 5).

As shown in FIGS. 2 and 4, a movable bank 17 is slidably provided on the belt conveyor unit 10. More specifically, the movable bank 17 is detachably attached to the belt conveyor unit 10 as the opposite ends of the movable bank 17 are held by the side conveyors.

As described above, the bottom conveyor 12 and side conveyors 13, 13 are movable in a direction of K1 in synchronism with each other and the movable bank 17 is movable in a K2 direction along with those bottom and side conveyors. As a result, soymilk supplied in a space formed by the bottom conveyor 12 and the fixed bank 16 and the movable bank 17 is being matured and solidified while being carried by the conveyor unit 10. When the portion of soymilk reaches the downstream end of the belt conveyor unit 10, then the portion of the soymilk is extracted out to the top from the apparatus.

A cover 18 is provided on the top of the side frames as shown in FIGS. 2 and 3 as indicated by a phantom line so that when necessary the top portion of the side frames is covered by the cover 18. Furthermore, a steam unit (unillustrated) is embodied with the support table 11 and side frames 11a, 11a to heat up the soymilk carried on the belt conveyor unit 10.

The first supply nozzle 21 is hereinafter described along with FIGS. 2 and 5.

The first supply nozzle 21 is provided on an upstream area of the belt conveyor unit 10 via a frame 22 in the shape of an inverted U. The lower ends of the inverted U shaped frame 22 each is fixed in an upright posture on a laterally extended frame support member 15b, 15b of the frame unit 15.

In a front side of the frame 22, a screw shaft 23 and a guide rod 23c are horizontally arranged via left and right brackets 23a, 23a. A screw member 24c is provided on the screw shaft 23 such that the screw member 24c is in mesh with the screw shaft 23. Thus the screw member 24c is movable in the lateral direction of the apparatus (widthwise direction of the belt conveyor 10) along with a rotation of the screw shaft 23. A drive motor 23b is connected to the end of the screw shaft 23 to rotate the screw shaft 23. Similarly, a slider 24d is provided on the guide rod 23c such that the slider 24d is movable in the lateral direction of the belt conveyor unit 10.

A common bracket 24a is mounted to both the screw member 24c and the slider 24d. The bracket 24a has a screw shaft 24 with a maneuvering handle 24b, and guide rods 24e, 24e all arranged in a vertical direction of the apparatus. A screw member 21c is provided on the screw shaft 24 in mesh state and sliders 21d, 21d each is slidably provided on the respective guide rods 24e, 24e. As a result, the screw member 21c and the sliders 21d, 21d all are movable in a vertical direction of the apparatus.

Furthermore, a plate like bracket 21a is mounted commonly to the screw member 21c, and the sliders 21d, 21d and the first supply nozzle 21, facing downward, is mounted on the bracket 21a via a pair of mounting jigs 21b, 21b.

The first supply nozzle has a leading end having a rectangle cross section and is set to open obliquely downward in an upstream direction of the apparatus. The first supply nozzle is connected to an unillustrated soybean tank.

With thus constructed mechanism, the first supply nozzle 21 is movable in a lateral (or a widthwise) direction of the belt conveyor 10 via the brackets 21a and 24a and the screw member 24c driven by the drive motor 23b. Since the drive motor 23b is driven in a forward and in a reversed direction, the reciprocal motion of the first supply nozzle 21 in the lateral direction of the belt conveyor unit 10 can be effected. Note that the bracket 24a is supported by not only the screw member 24c but also by the slider 24d on the guide rod 23c thus the stableness of the movement of the first supply nozzle is assured.

Furthermore, rotating the screw shaft 24 by the maneuvering handle 24b enables a height adjustment of the first supply nozzle with respect to the belt conveyor unit 10. The bracket 21a is supported by the sliders 21s, 21d and the screw member 21c, thus similar to the horizontal movement of the nozzle as mentioned above, the vertical movement of the first supply nozzle 21 fixed on the bracket 21a is carried out in a stable manner.

Next the second supply nozzle 31 is described with reference to FIGS. 2 and 6 as in the following.

The second supply nozzle 31 is arranged in an intermediate portion of the belt conveyor unit 10 via a frame 32 of an inverted U shape and a movable frame 35.

Very similar to the first supply nozzle 21, the second nozzle 31 is reciprocally movable in the lateral direction of the belt conveyor unit 10 via similar parts including a screw shaft 33 and a guide rod 33c both arranged in a horizontal posture and a screw member and a slider that move along the screw shaft and guide rod respectively.

In the same way, a vertical movement of the second supply nozzle 31 with respect to the conveyor belt unit 10 is realized by a combination of the parts including a screw member and a slider that are movably (in a vertical direction) provided on a screw shaft 34 and a guide rod 34e respectively. The members (elements) in FIGS. 2 and 6 with reference numerals 31–34 (including suffix) correspond to the members in FIGS. 2 and 5 with reference numerals 21–24.

An opening of the second supply nozzle 31 is oriented downward and the second supply nozzle 31 is connected to an unillustrated soymilk tank as well.

The frame 32 is mounted on the movable frame 35 in an inverted U shape. Thus the movable frame 35 is arranged so as to cross over the belt conveyor unit 10 and the movable frame 35 has a pair of upright legs each with casters 35c, 35c. In addition, a pair of fixing bolts 35d, 35d are arranged on front side and rear side of the casters 35c, 35c to lift up the casters 35c, 35c so that the casters no longer roll over the ground, leading the movable frame 35 in a stationary state.

With this construction, the movable frame 35 is movable along a longitudinal direction of the belt conveyor unit 10, it therefore enables an adjustment of the position of the second supply nozzle along the longitudinal direction of the belt conveyor unit 10. Then when a proper position of the second supply nozzle is determined, the second supply nozzle is fixed at the position by the fixing bolts 35d, 35d being in contact with the ground.

A back flow prevention roller 36 (hereinafter referred to as BFP roller) is provided on an upstream side of the movable frame 35. The movable frame 35 on the upstream side is provided with a pair of support frames 36e each extending from an upper portion of each of the upright legs 35g, 35g, guide frames 36d, 36d vertically extending from each support frame 36e, and a sliding plate 36b movable in a vertical direction along the inner sides of the guide frames 36d, 36d. A shaft 36a extends from opposite ends of the BFP roller 36. And a pair of shafts 36a, 36a are supported by the sliding plates 36b, 36b on both sides of the legs 35g, 35g respectively. The BFP roller 36 is set rotatable about the axis of the shaft pairs 36a, 36a. It is possible to mount a motor 36c as shown in FIG. 6 at the far end of the shaft 36a to positively rotate the shaft 36a (the BFP roller 36) in a direction indicated by an arrow K9. In addition, a screw shaft 36h with a handle is provided to move the sliding plate 36b in the vertical direction, enabling a height adjustment of the BFP roller 36 with respect to the belt conveyor roller 10.

As described in the above, the second supply nozzle 31 and the BFP roller 36 are mounted on the common movable frame 35, thus movement of the second supply nozzle 31 in the longitudinal direction of the belt conveyor unit 10 by the movable frame 35 is always in synchronism with the movement of the BFP roller 36. In other words, the longitudinal movements of the second supply nozzle 31 and the back flow prevention motor 36 along with the movable frame 35 are the same.

Next the hopper unit 41 of the apparatus as the embodiment of this invention is described with reference to FIGS. 2 and 4.

The hopper unit 41 is disposed between the first supply nozzle 21 and the second supply nozzle 31 and on the upstream side of the BFP roller 36. At a lower side of the hopper unit 41, there is provided a supply opening 41a extending in the lateral direction of the belt conveyor unit 10 (i.e., perpendicular to the longitudinal direction of the belt conveyor unit 10).

The hopper unit 41 is to drop garnishes through its supply opening 41a onto the belt conveyor unit 10 at a predetermined pitch in a well ordered manner.

Hereinafter operations of the apparatus of this invention is described.

FIGS. 7A and 7B are explanatory diagrams showing side view of the operations of the apparatus of this invention. FIG. 7A is a view showing a state when the BFP roller 36 is lifted up and FIG. 7B is a view showing a state when the BFP roller 36 is lowered to a certain height.

First of all, for the initial setting, the bottom conveyor 12 and side conveyors 13, 13 are put in a stationary state and the movable bank 17 is set to stay at immediately downstream side of the first supply nozzle 21 (FIG. 7A).

Furthermore, the height of the first supply nozzle 21 from the bottom conveyor 12 is set at a certain position and the position of the second supply nozzle 31 on the downstream side of the first supply nozzle 21 is properly set by moving the movable frame 35. The height of the second supply nozzle 31 is set higher than that of the first supply nozzle 21 as additional soymilk is supplied at the second supply nozzle 31 over the layer formed by the first supplied soymilk on the belt conveyor unit 10.

The height of the BFP roller 36 is set higher than that of the top of the movable bank 17 as shown in FIG. 7A by a solid line. The hopper unit 41 is filled with garnishes.

Then soymilk is supplied to the first supply nozzle 21 from the unillustrated soymilk tank and the first supply nozzle 21 is reciprocally moved in the lateral direction of the belt conveyor unit 10 to continuously supply soymilk S over the belt conveyor unit 10. When a level of the soymilk supplied over the bottom conveyor 12 reached a certain point, a height d1 (also a thickness d1), the bottom conveyor 12 and the side conveyors 13, 13 are simultaneously moved and the supplied soymilk is warmed up to enhance maturing and solidifying process while being carried over the belt conveyor unit 10. Note that a certain amount of coagulant is blended into soymilk at a point between the unillustrated soymilk tank and the first supply nozzle 21 to supply soymilk with coagulant over the belt conveyor unit 10.

The movable bank 17 is moved downstream along with the bottom conveyor 12 and the side conveyors 13, 13 to prevent the first supplied soymilk from overflowing to downstream side.

After the movable bank 17 passes underneath the hopper unit 41 (shown by a dot-dash line in FIG. 7A), the hopper unit 41 discharges garnishes over the surface of the first supplied soymilk at a time interval corresponding to a moving distance d2 of the movable bank 17 in such a manner that the plural garnishes discharged at a time are aligned over the surface of soymilk in the lateral direction (perpendicular to the moving direction) of the belt conveyor unit 10 (see FIG. 4). It should be noted that when the centralizing the garnish in the individual bean curd as a final product is of primary concerns, pitches between garnishes placed over the surface of soymilk both in the longitudinal direction and the lateral direction are adequately set in advance.

Then when the movable bank 17 passes underneath the BFP roller 36 in a moving direction, the BFP roller 36 is lowered to a position where the lowermost of the BFP roller 36 makes contact with the surface of the first supplied soymilk being carried over the belt conveyor unit 10 as shown in FIG. 7A by a double dot—dash line. As the BFP roller 36 is rotated by the drive motor 36c in a K9 direction (indicated by an arrow in FIGS. 7A and 7B), the garnishes placed over the surface of the first supplied soymilk are depressed into the soymilk to position at a desired height (see FIG. 7B, downstream of BFP roller 36). Note that the first supplied soymilk at around the BFP roller 36 is halfway solidified as a good amount of time has already passed from a time of supply at the first supply nozzle 21.

When the movable bank 17 passes underneath the second supply nozzle 31, then the second supply nozzle 31 begins supply of additional soymilk over the halfway solidified first supplied soymilk being carried over the belt conveyor unit 10 while the second supply nozzle 31 is reciprocally moved in the lateral direction of the belt conveyor unit 10. Note that this additionally (second) supplied soymilk contains a certain amount of coagulant as it is being blended with the soymilk before coming out of the second supply nozzle 31.

The second soymilk supply is set such that a depth of the soymilk (a combination of halfway solidified first supplied soymilk with garnishes placed therein and the newly supplied additional soymilk) being carried over the belt conveyor unit 10 to be measured "d3" that is about twice of "d1" supplied by the first supply nozzle 21.

The BFP roller 36 as it is rotated in the K9 direction prevents the secondary supplied soymilk from flowing backward over the belt conveyor unit 10. Here the rotational speed of the BFP roller 36 is preferably set such that a corresponding peripheral velocity (velocity at the outer surface of the BFP roller 36) of the BFP roller 36 is equal to or slightly faster than the moving speed of the soymilk S (a linear speed of the movable bank 17).

Thereafter, when the belt conveyor unit 10 is further moved to downstream during this period the leading end portion of soymilk completes solidification process and the bean curd with garnishes placed therein is continuously discharged from the downstream end of the belt conveyor unit 10. It should be noted that the movable bank 17 when it reaches at the downstream end of the belt conveyor unit 10 is removed from the conveyor unit 10.

By repeating the foregoing steps over again, it is made possible to continuously produce the bean curd with garnishes placed therein.

The bean curd with garnishes placed therein right after discharged form the downstream end of the apparatus is subject to a cooling process where the bean curd is cooled down to a freezing temperature via submergence into a water tank and a cutting process where the bean curd is cut into the desired shape and dimensions.

Some modifications are readily thought by those with ordinary skill in the field. The apparatus described along with FIGS. 2–7 is no way considered to be bound by those elements in FIGS. 2–7. For instance, the movable frame 35 mounting the second supply nozzle 31 may take a form such that the movable frame 35 is carried on a pair of guide rails extending laterally outwardly along the belt conveyor unit 10.

Furthermore, in the foregoing description, the first supply nozzle 21 and the second supply nozzle 31 each is driven to move along the lateral direction of the apparatus, it, however, is possible that for instance the first supply nozzle 21 takes a form such as a plurality of nozzles that are fixed (in the lateral direction) and aligned in the lateral direction so that the plural nozzles uniformly supply soymilk over the lateral direction of the belt conveyor unit 10. The second supply nozzle may take the same form.

With the apparatus of this invention, the supply soymilk is carried out twice; the first supply of soymilk forms a bottom layer on the belt conveyor unit 10 on which garnish (es) is/are placed in an aligned manner and the second supply of soymilk forms a top layer over the first layer. As a result, a bean curd with a garnish placed in the middle thereof as a high value added product in this field is continuously produced. Furthermore, the total production time is considerably reduced, enabling a mass production that is quite contrary to the batch process earlier mentioned as a drawback of the conventional method. Yet furthermore, with the apparatus the bean curd with garnish wrapped therein is smoothly and reliably produced.

Although the present invention has been fully described by way of examples with reference to the accompanied drawings, it is to be understood that various changes and modifications will be apparent to those skilled in the art. Therefore, unless otherwise such changes and modifications depart from the scope of this invention, they should be construed as being included therein.

What is claimed is:

1. An apparatus for continuously producing bean curd with garnish therein, the apparatus comprising:

a belt conveyor unit;

a first soymilk supply nozzle positioned in an upstream area of the conveyor unit;

a second soymilk supply nozzle positioned downstream of the first soymilk supply nozzle; and a garnish placement hopper unit provided between the first soymilk supply nozzle and the second soymilk supply nozzle;

whereby the soymilk with the garnish therein is solidified by the coagulant and turned into bean curd.

2. The apparatus according to claim 1, wherein the belt conveyor unit includes a bottom conveyor and side conveyors, said bottom conveyor moving in synchronism with the side conveyors.

3. The apparatus according to claim 1, further comprising:

a fixed bank plate arranged on an upstream end of the belt conveyor unit and a second bank plate for moving along with the bottom conveyor and the side conveyors.

4. The apparatus according to claim 1, wherein the second soymilk supply nozzle is set movable along a longitudinal direction of the belt conveyor unit.

5. The apparatus according to claim 1, further comprising a soymilk back-flow prevention roller provided between the hopper unit and the second soymilk supply nozzle.

6. The apparatus according to claim 5, wherein the soymilk back-flow prevention roller is set movable in synchronism with the second soymilk supply nozzle.

7. The apparatus according to claim 1, wherein the first soymilk supply nozzle and the second soymilk supply nozzle are set to move along a widthwise direction of the belt conveyor unit.

* * * * *

UNITED STATES PATENT AND TRADEMARK OFFICE
CERTIFICATE OF CORRECTION

PATENT NO. : 5,957,042

DATED : September 28, 1999

INVENTOR(S): Hiroaki IWAMOTO

It is certified that an error appears in the above-identified patent and that said Letters Patent is hereby corrected as shown below:

On the title page, the Foreign Application Priority Data has been omitted. It should be:

--[30] Foreign Application Priority Data

Apr. 18, 1997  [JP]  Japan........................ 9-101641 --

Signed and Sealed this

Twenty-second Day of August, 2000

Attest:

Q. TODD DICKINSON

*Attesting Officer*   *Director of Patents and Trademarks*